Jan. 25, 1938.  E. B. EKDAHL  2,106,453
PORTABLE STRAINER FOR INSERTION IN THE MOUTHS OF LIQUID CONTAINERS
Filed March 27, 1935
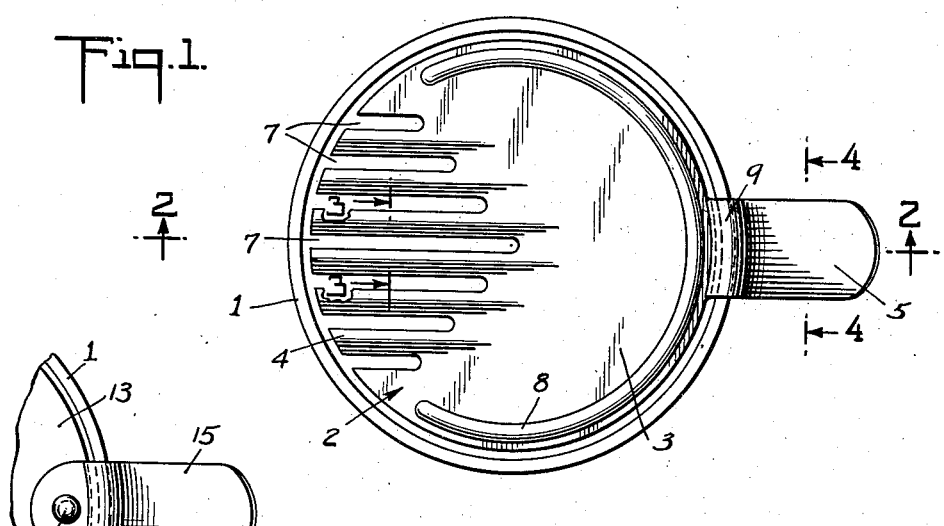
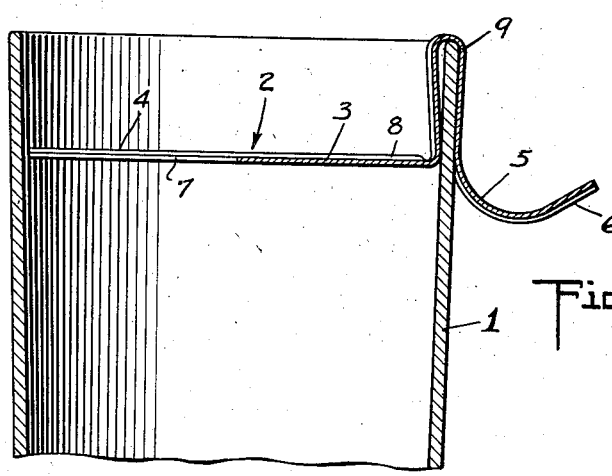
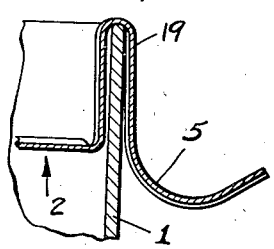
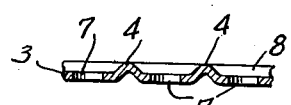
INVENTOR
*Edward B. Ekdahl*
BY
ATTORNEY Patented Jan. 25, 1938

2,106,453

UNITED STATES PATENT OFFICE 2,106,453

PORTABLE STRAINER FOR INSERTION IN THE MOUTHS OF LIQUID CONTAINERS

Edward B. Ekdahl, Irvington, N. J., assignor to Sefco, Inc., Newark, N. J., a corporation of New Jersey Application March 27, 1935, Serial No. 13,199

4 Claims. (Cl. 210—155)

This invention relates to strainers for use in the preparation of cocktails and like beverages for the purpose of separating out the ice, fruit fibres and such other solid matter as may be used for flavoring and cooling the required mixture.

One of the objects of the invention is the production of a device that will be easy to clean and thus sanitary due to the absence of wire mesh, small holes, curved surfaces or projections and intersections of surfaces that would permit the lodging of particles which are not readily and easily removable.

Another object of the invention is the production of a device that is easy to apply to the container used and that will be stable in its operative position while at the same time permitting the user to grip the container comfortably and securely when pouring out its contents, and which may thereafter be readily removed by the hand which has held the container during the pouring.

Another object of the invention is the production of a liquid straining device for the purpose described from a single piece of sheet metal, if so desired, in a few mechanical operations and at a small expense.

Referring to the drawing:

Fig. 1 is a plan view of the strainer;

Fig. 2 is a detail diametrical section on line 2—2 of Fig. 1;

Fig. 3 is a detail section on line 3—3 of Fig. 1;

Fig. 4 is a similar section on line 4—4 of Fig. 1;

Fig. 5 is a detail in cross section of a modification showing the preferred form of means for enabling the user to hold the strainer in operative position, and Fig. 6 is a fragmentary plan view of another.

Throughout the drawing like reference characters indicate like parts.

Fig. 1 shows the strainer in front elevation in position for use in the open end of the container 1, and 2 indicates a disc stamped from thin sheet metal which has a series of parallel slots 7, 7, punched out along one portion thereof to form a plurality of parallel fingers 4, 4, serving as strainers for the liquid contents of the container 1 when the same is tipped over to pour out the said liquid contents.

5 is a tab or handle exending from a portion of the disc, preferably opposite to that in which the above described fingers are formed, which is first bent forwardly, then over and backwardly to form a loop 9 adapted to enclose the edge portion of the wall of the container 1. A further portion of the tab or handle is curved outwardly to form a finger grip which is clearly shown in Fig. 1, Fig. 2 and Fig. 5.

The tab or handle may be formed transversely as shown on a larger scale at 6 in Fig. 4, to stiffen it. The loop 9 may be formed to grip the container wall with a spring pressure as is shown in Fig. 2 or preferably may be formed to enclose the container wall loosely as shown in Fig. 5.

The advantages of this loosely fitting form of loop 9 result from the fact that when it is employed the strainer can be more easily placed in position in or removed from the glass or other container 1, with one hand, while the bartender can be doing other things with his other hand. If the loop tightly clamps the edge of the glass as occurs in the use of the modification shown in Fig. 2, the user must then hold the glass with one hand while he removes the strainer with the other. The fact that the preferred construction shown in Fig. 5 leaves the strainer somewhat loosely seated in the mouth of the container does not matter as the forefinger of the hand holding the latter is always hooked over handle 5 in order to get a firmer grip on the assembled apparatus. Consequently there is never any danger of the strainer dropping out of the container mouth during the pouring operation, although the handle loop 9 does not clasp with spring pressure the wall edge portion which it straddles.

In place of the integral handle 5, a separate piece 15 may be riveted at 12 to a circular disc 13. Also the joint might be made by spot welding or brasing.

It may be noted by referring to Fig. 2, which shows the container in operative position, that the user may grip the container firmly at a point approximately its center of gravity and at the same time stabilize the strainer easily with the index finger.

The device may be made in a single stamping or in two separate pieces with the disc and tab or handle connected by spot welding or other approved method. Also the body portion of the disc may be stiffened with an arcuate rib 8 stamped in it along that portion of its edge which is not slotted to form the fingers 4, 4.

Also the fingers may have longitudinally extending stiffening ribs stamped in them as is best shown in Fig. 3.

Having described my invention, I claim:

1. A new article of manufacture substantially such as herein described comprising a circular disc of spring metal having an integral tab projecting from its edge and bent so as to form a clamp for engaging an edge portion of the wall around the mouth of any liquid container in which said disc may be inserted; other portions of said disc being slotted to form a plurality of parallel fingers to form a strainer for liquid poured from said container mouth while said disc is held therein.

2. An article such as defined in claim 1 in which said fingers are bent transversely to form longitudinal ribs for stiffening them.

3. As a new article of manufacture, a portable strainer for insertion in the mouth of a liquid container which comprises a thin disc having an outline such as to permit it to substantially fill the mouth of such container and an upwardly and downwardly bent extension adapted to loosely engage an edge portion of the container wall at one side of the latter's mouth when said disc extends across the same, whereby said disc may be removed from such container without the latter being firmly held; said disc also having a plurality of small openings formed in it in the form of a plurality of parallel slots which extend to the periphery of said disc at points remote from said extension through which liquid may pass.

4. An article such as defined in claim 3 in which said slots are arranged to form parallel fingers, each of which is bent in cross section with its concave surface so formed located on its under side.

EDWARD B. EKDAHL.